(12) United States Patent
Peng et al.

(10) Patent No.: US 8,995,766 B1
(45) Date of Patent: Mar. 31, 2015

(54) IMAGE PROCESSING METHOD AND IMAGE PROCESSING DEVICE

(71) Applicant: Himax Imaging Limited, Tainan (TW)

(72) Inventors: Yuan-Chih Peng, Tainan (TW); Yi-Lin Tsai, Tainan (TW)

(73) Assignee: Himax Imaging Limited, Tainan (TW)

( * ) Notice: Subject to any disclaimer, the term of this patent is extended or adjusted under 35 U.S.C. 154(b) by 67 days.

(21) Appl. No.: 14/039,115

(22) Filed: Sep. 27, 2013

(51) Int. Cl.
G06K 9/00 (2006.01)
G06T 5/20 (2006.01)
G06T 5/00 (2006.01)
H04N 9/73 (2006.01)
H04N 9/77 (2006.01)

(52) U.S. Cl.
CPC . *G06T 5/20* (2013.01); *G06T 5/002* (2013.01); *H04N 9/735* (2013.01); *H04N 9/77* (2013.01); *G06T 2207/10024* (2013.01); *G06T 2207/10004* (2013.01); *G06T 2207/20024* (2013.01); *G06T 2207/20182* (2013.01)
USPC .......................................... 382/167

(58) Field of Classification Search
None
See application file for complete search history.

(56) References Cited

U.S. PATENT DOCUMENTS

| 7,876,957 | B2 * | 1/2011 | Ovsiannikov et al. | 382/167 |
| 8,675,102 | B2 * | 3/2014 | Baqai et al. | 348/241 |
| 2008/0012969 | A1 * | 1/2008 | Kasai et al. | 348/266 |
| 2009/0154826 | A1 * | 6/2009 | Park et al. | 382/260 |
| 2009/0263017 | A1 * | 10/2009 | Tanbakuchi | 382/167 |
| 2009/0285480 | A1 * | 11/2009 | Bennett et al. | 382/167 |

* cited by examiner

*Primary Examiner* — Phuoc Tran
(74) *Attorney, Agent, or Firm* — McClure, Qualey & Rodack, LLP

(57) ABSTRACT

An image processing module is provided. A de-mosaic unit in the image processing module includes an edge direction detection unit and a multi-pixel directional interpolation unit. The edge direction detection unit is used to determine a first color row luminance difference according to a plurality of first color pixels of a pixel row of raw data, and determine a first color column luminance difference according to a plurality of first color pixels of a pixel column of raw data. The multi-pixels directional interpolation unit is used to determine pixel luminance of a third color array according to the first color column luminance difference, the first color row luminance difference, the third color pixels adjacent to a first color pixel and the third color pixels adjacent to a second color pixel.

13 Claims, 7 Drawing Sheets

| 1/16 | 0 | 1/16 | 0 | 1/16 |
|------|------|------|------|------|
| 0 | 1/16 | 0 | 1/16 | 0 |
| 1/16 | 0 | 4/16 | 0 | 1/16 |
| 0 | 1/16 | 0 | 1/16 | 0 |
| 1/16 | 0 | 1/16 | 0 | 1/16 |

FIG. 6

IMAGE PROCESSING METHOD AND IMAGE PROCESSING DEVICE

BACKGROUND OF THE INVENTION

1. Field of the Invention

The present disclosure relates to an image processing method and an image processing device.

2. Description of the Related Art

A color filter array (CFA) in a Complementary Metal-Oxide-Semiconductor (CMOS) sensor is usually arranged in Bayer pattern. Raw data from a sensor is processed by de-mosaic processing (color interpolation) to produce an image, wherein each pixel of the image includes red, green and blue components. For example, a Bayer pattern is formed by one red pixel, one blue pixel and two green pixels (Gb and Gr) arranged in a 2*2 pixel array. The green pixel Gb is a green pixel arranged in a row with the blue pixels, and the green pixel Gr is a green pixel arranged in a row with the red pixels. The light amplitude of the green pixels Gb and Gr may be different due to layout or manufacturing differences, even with identical incident lights. Thus, a so-called false texture or maze artifact may occur after the de-mosaic processing.

A typical image processing device has a Gb/Gr imbalance correction unit to correct the differences of the green pixels. Referring to an exemplary Bayer pattern in FIG. 1, a conventional Gb/Gr imbalance correction method can be expressed as the following formula:

$$Gr\_avg = (G0+G1+G5+G6)/4$$

$$Gb\_avg = (2*G3+G2+G4)/4$$

$$G\_diff = Gr\_avg - Gb\_avg$$

$$G3\_bal = G3 + G\_diff$$

Take the green pixel g3 which is arranged in a row with the blue pixels as an example. The Gr_avg is an average of the green pixels in two rows with the red pixels, and the Gb_avg is an average of the green pixels in one row with the blue pixels. G_diff is a difference between Gr_avg and Gb_avg. The compensation value G3_bal of the green pixel g3 is equal to an original value G3 of the green pixel g3 plus the difference between the Gr_avg and Gb_avg. The method keeps the Gr values of the green pixels unchanged (namely, keeps the values of the green pixels in the row with the red pixels unchanged), but adjusts the Gb values of the green pixels.

However, the conventional Gr/Gb imbalance correction method will cause the edge to blur. In fact, the false texture or maze artifact is only obvious on the smooth region of an image, which is masked by the edge transition around the edge of the image. Therefore, a new Gr/Gb imbalance correction method which is able to suppress the false texture or maze artifact, and blurred-edges is called for.

BRIEF SUMMARY OF INVENTION

A detailed description is given in the following embodiments with reference to the accompanying drawings.

In one embodiment, the invention provides an image processing method adapted to correct the luminance of green pixels in a Bayer pattern. The image processing method comprising: generating a low-pass weight according to a luminance difference average between a predetermined green pixel and a plurality of green pixels, a first predetermined luminance and a second predetermined luminance by a content adaptive unit; generating a de-noise value according to a luminance weighted average of a plurality of green pixels by a de-noise filter unit; generating a first color weighted value according to the low-pass weight and a luminance weighted average of the plurality of green pixels within the first color area, generating a second color weighted value according to the low-pass weight and a luminance weighted average of the plurality of green pixels within the second color area, and generating a color weighted difference according to the first color weighted value and the second color weighted value by a color weighted calculation unit; generating a mixed luminance value according to the low-pass weight, the de-noise value and the luminance of the predetermined green pixel by a mix unit; and generating a luminance corrected value according to the mixed luminance value, a first luminance average, a second luminance average, the color weighted difference and a control parameter by a compensation unit.

In one embodiment, the invention provides an image processing method. The image processing method comprises: generating a plurality of weighted values according to the luminance difference average between a predetermined green pixel and a plurality of pixels by a content adaptive unit; generating a de-noise value according to the products of each of the weighted values and each of the plurality of green pixels, and a summation of the plurality of weighted values by a de-noise filter unit; generating a first color weighted value according to a summation of the weighted values of the plurality of green values within a first color area and the volume of the plurality of green pixels, generating a second color weighted value according to a summation of the weighted values of the plurality of green values within a second color area and the volume of the plurality of green pixels, and generating a color weighted difference according to the first color weighted value and the second color weighted value by a color weighted calculation unit; and generating a luminance corrected value of the predetermined green pixel according to a first luminance average, a second luminance average, the de-noise value, the color weighted difference and a control parameter by a compensation unit.

In another embodiment, the invention provides an image processing device adapted to correct the luminance of green pixels in a Bayer pattern. The image processing device includes a content adaptive unit used for generating a low-pass weight according to a luminance difference average between a predetermined green pixel and a plurality of green pixels, a first predetermined luminance and a second predetermined luminance. The image processing device further includes a de-noise filter unit used for generating a de-noise value according to a luminance weighted average of a plurality of green pixels. The image processing device further includes a color weighted calculation unit used for generating a first color weighted value according to the low-pass weight and a luminance weighted average of the plurality of green pixels within the first color area, generating a second color weighted value according to the low-pass weight and a luminance weighted average of the plurality of green pixels within the second color area, and generating a color weighted difference according to the first color weighted value and the second color weighted value. The image processing device further includes a mix unit used for generating a mixed luminance value according to the low-pass weight, the de-noise value and the luminance of the predetermined green pixel. The image processing device further includes a compensation unit used for generating a luminance corrected value according to the mixed luminance value, a first luminance average, a second luminance average, the color weighted difference and a control parameter.

In another embodiment, the invention provides an image processing device adapted to correct the luminance of green pixels in a Bayer pattern. The image processing device includes a content adaptive unit used for generating a plurality of weighted values according to the luminance difference average between a predetermined green pixel and a plurality of pixels. The image processing device further includes a de-noise filter unit used for generating a de-noise value according to the products of each of the weighted values and each of the plurality of green pixels, and a summation of the plurality of weighted values. The image processing device further includes a color weighted calculation unit used for generating a first color weighted value according to a summation of the weighted values of the plurality of green values within a first color area and the volume of the plurality of green pixels, generating a second color weighted value according to a summation of the weighted values of the plurality of green values within a second color area and the volume of the plurality of green pixels, and generating a color weighted difference according to the first color weighted value and the second color weighted value. The image processing device further includes a compensation unit used for generating a luminance corrected value of the predetermined green pixel according to a first luminance average, a second luminance average, the de-noise value, the color weighted difference and a control parameter.

The image processing method and the image processing device in the embodiment may not only correct the Gr/Gb imbalance to suppress false textures or maze artifacts on the smooth regions of an image, but also compensate for the Gr/Gb difference to suppress blurred-edges around the edges of an image.

BRIEF DESCRIPTION OF DRAWINGS

The present invention can be more fully understood by reading the subsequent detailed description and examples with references made to the accompanying drawings, wherein:

FIG. 1 is a diagram showing an exemplary Bayer pattern used in the conventional image processing method for correcting the luminance of the green pixels;

FIG. 2 is a diagram showing an exemplary Bayer pattern used in the image processing method for correcting the luminance of the green pixels according to the embodiment of the invention;

FIG. 6 shows a low-pass filter according to another embodiment of the invention;

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figures 1, 2:
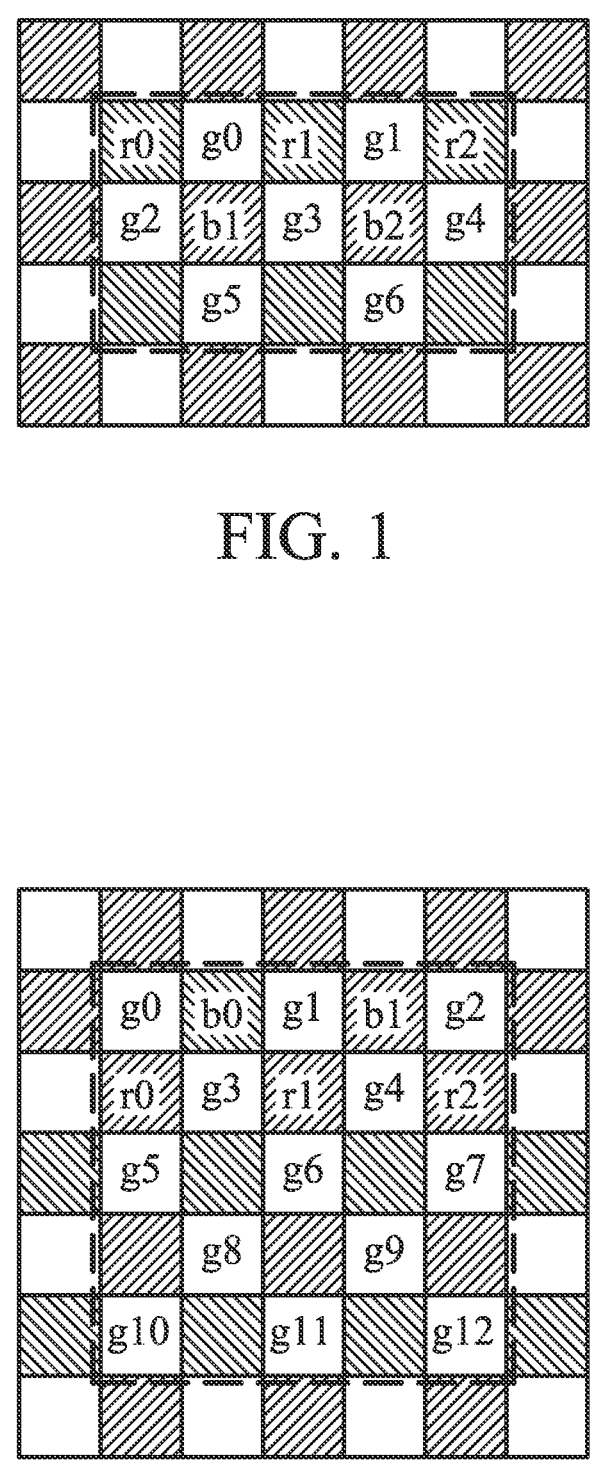
Figure 3:
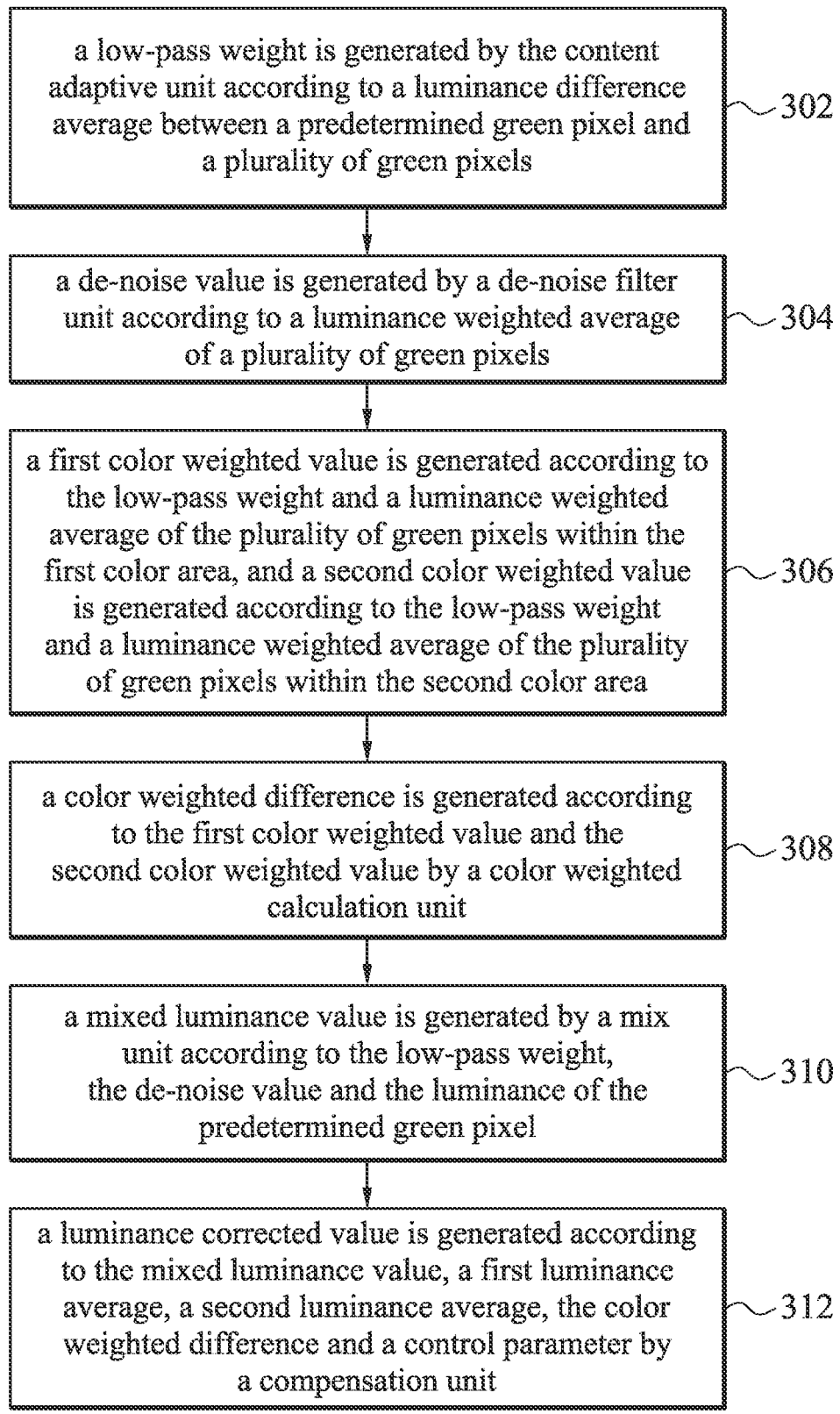
FIG. 3 is a flowchart illustrating the image processing method according to the embodiment of the invention.

FIG. 3 is a flowchart illustrating the image processing method according to the embodiment of the invention. Referring to FIG. 2, FIG. 2 is a diagram showing an exemplary Bayer pattern used in the image processing method. At step 302, a low-pass weight is generated by the content adaptive unit according to a luminance difference average ($G\_diff\_abs$) between a predetermined green pixel (g6) and a plurality of green pixels, a first predetermined luminance threshold ($th\_h$) and a second predetermined luminance threshold ($th\_l$).

In the embodiment, at first, the luminance difference average is obtained by the content adaptive unit according to a summation of absolute values of the luminance differences between the predetermined green pixel (g6) and a plurality of green pixels, and the volume of the plurality of green pixels. The luminance difference average ($G\_diff\_abs$) can be expressed as the following equation:

$$G\_diff\_abs=(|G6-G0|+|G6-G1|+|G6-G2|+|G6-G3|+|G6-G4|+|G6-G5|+|G6-G7|+|G6-G8|+|G6-G9|+|G6-G10|+|G6-G11|+|G6-G12|)/12$$

The values G0-G11 respectively represent the luminance of the green pixels g0-g11.

The first predetermined luminance and the second predetermined luminance and the luminance difference average are used to determine a regulated luminance difference average ($G\_diff\_abs\_new$). In the embodiment, the first predetermined luminance threshold ($th\_h$) is larger than the second predetermined luminance threshold ($th\_l$). When the luminance difference average ($G\_diff\_abs$) is larger than the first predetermined luminance threshold ($th\_h$), the regulated luminance difference average ($G\_diff\_abs\_new$) is equal to the first predetermined luminance threshold ($th\_h$). When the luminance difference average ($G\_diff\_abs$) is smaller than the second predetermined luminance threshold ($th\_l$), the regulated luminance difference average ($G\_diff\_abs\_new$) is equal to the second predetermined luminance threshold ($th\_l$). Otherwise, the regulated luminance difference average ($G\_diff\_abs\_new$) is equal to the luminance difference ($G\_diff\_abs$). In other words, the regulated luminance difference average ($G\_diff\_abs\_new$) is limited to be between the first predetermined luminance threshold ($th\_h$) and the second predetermined luminance threshold ($th\_l$).

Finally, the low-pass weight ($W\_lpf$) may be determined according to the following equation:

$$W\_lpf=1-(G\_diff\_abs-th\_l)/(th\_h-th\_l)$$

Next, at step 304, a de-noise value is generated by a de-noise filter unit according to a luminance weighted average of a plurality of green pixels. The de-noise value ($G\_lpf$) may be determined according to the following equation:

$$G\_lpf=(G0+G1+G2+G3+G4+G5+4*G6+G7+G8+G9+G10+G11+G12)/16$$

It is noted that the weighted multiplier of the green pixel g6 (i.e. the predetermined green pixel) is 4.

At step 306, a first color weighted value is generated according to the low-pass weight and a luminance weighted average of the plurality of green pixels within the first color area, and a second color weighted value is generated according to the low-pass weight and a luminance weighted average of the plurality of green pixels within the second color area. The first color weighted value may be expressed as the following equation:

$$weight\_Gb=(1/16+1/16+1/16+1/16+4/16+1/16+1/16+1/16+1/16)*W\_lpf$$

It is noted that the plurality of weighted multipliers 1/16 respectively represent the green pixels g0, g1, g2, g5, g7, g10, g11, and g12 which are arranged in the rows with the blue pixels. The weighted multiplier 4/16 represents the predetermined pixel g6. The second color weighted value may be expressed as the following equation:

$$\text{weight\_}Gr=(1/16+1/16+1/16+1/16)*W\_lpf$$

It is noted that the plurality of weighted multipliers 1/16 respectively represent the green pixels g3, g4, g8, and g9 which are arranged in the rows with the red pixels.

At step 308, a color weighted difference is generated according to the first color weighted value and the second color weighted value by a color weighted calculation unit. The color weighted difference (weight_GbGr_diff) may be expressed as the following equation:

$$\text{weight\_}GbGr\_\text{diff}=\text{weight\_}Gb-\text{weight\_}Gr$$

At step 310, a mixed luminance value is generated by a mix unit according to the low-pass weight, the de-noise value and the luminance of the predetermined green pixel. The mixed luminance value (g_mix@g6) may be expressed as the following equation:

$$g\_mix@g6=W\_lpf*g\_lpf+(1-W\_lpf)*G6$$

At step 312, a luminance corrected value is generated according to the mixed luminance value, a first luminance average, a second luminance average, the color weighted difference and a control parameter by a compensation unit. The first luminance average (Gb_avg) may be expressed as the following equation:

$$Gb\_avg=(G0+G1+G2+G5+G6+G7+G10+G11+G12)/9$$

The green pixels g0, g1, g2, g5, g6, g7, g10, g11, and g12 are arranged in the rows with the blue pixels. The second luminance average (Gr_avg) may be expressed as the following equation:

$$Gr\_avg=(G3+G4+G8+G9)/4$$

The green pixels g3, g4, g8, and g9 are arranged in the rows with the red pixels.

The luminance corrected value is a summation of the mixed luminance value (g_mix@g6), an average of a difference between the first luminance average (Gr_avg) and the second luminance average (Gb_avg), and the product of the color weighted difference (weight_GbGr_diff) and the control parameter (str). The luminance corrected value (g_out@g6) may be expressed as the following equation:

$$g\_out@g6=g\_mix@g6+(Gr\_avg-Gb\_avg)/2*\text{weight\_}GbGr\_\text{diff}*str$$

Figure 4:
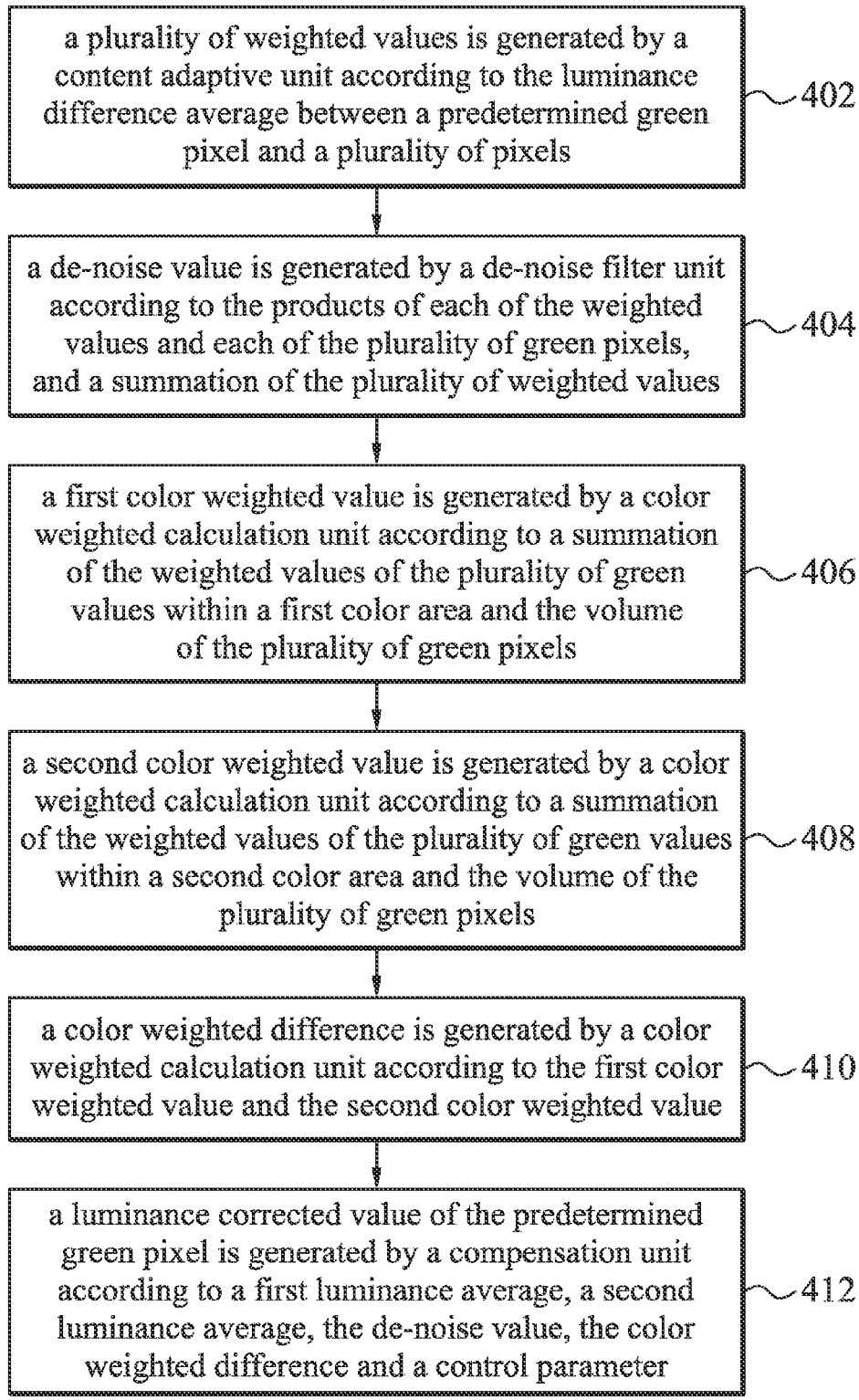
FIG. 4 is a flowchart illustrating the image processing method according to another embodiment of the invention.

FIG. 4 is a flowchart illustrating the image processing method according to another embodiment of the invention. Referring to FIG. 2, FIG. 2 is a diagram showing an exemplary Bayer pattern used in the image processing method. At step 402, a plurality of weighted values is generated by a content adaptive unit according to the luminance difference average between a predetermined green pixel and a plurality of pixels. A single weighted value may be determined according to an absolute value of a difference between the luminance of the predetermined green pixel and the luminance of one of the plurality of pixels divided by a maximum difference. The weighted values may be expressed as the following equation:

$$Wn=1-|G6-Gn|/\text{diff\_max, clip to (0,1)},$$

wherein n is from 0 to 12. The maximum difference (diff_max) is pre-determined by users such as 255. The range of the weighted value is from zero to one. Wn represents the weighted values, and Gn represents the luminance values of the green pixels. In the embodiment, the predetermined green pixel is g6. For example, the weighted values W0 and W1 can be expressed as the following equations according to the above equation:

$$W0=1-|G6-G0|/\text{diff\_max, clip to (0,1)}$$

$$W1=1-|G6-G1|/\text{diff\_max, clip to (0,1)}$$

In the embodiment, when the weighted value (Wn) is zero, it means that the luminance between the predetermined green pixel g6 and gn is large, and vise versa.

Next, at step 404, a de-noise value is generated by a de-noise filter unit according to the products of each of the weighted values and each of the plurality of green pixels, and a summation of the plurality of weighted values. The summation of the plurality of weighted values may be expressed as the following equation:

$$w\_sum=w0+w1+w2+w3+w4+w5+w6+w7+w8+w9+w10+w11+w12$$

The de-noise value may be expressed as the following equation:

$$g\_lpf=(w0*g0+w1*g1+w2*g2+w3*g3+w4*g4+w5*g5+w6*g6+w7*g7+w8*g8+w9*g9+w10*g10+w11*g11+w12*g12)/w\_sum$$

Next, at step 406, a first color weighted value is generated by a color weighted calculation unit according to a summation of the weighted values of the plurality of green values within a first color area and the volume of the plurality of green pixels. The first color weighted value (weight_Gb) may be expressed as the following equation:

$$\text{weight\_}Gb=(w0+w1+w2+w5+w6+w7+w10+w11+w12)/13$$

At step 408, a second color weighted value is generated by a color weighted calculation unit according to a summation of the weighted values of the plurality of green values within a second color area and the volume of the plurality of green pixels. The second color weighted value (weight_Gr) may be expressed as the following equation:

$$\text{weight\_}Gr=(w3+w4+w8+w9)/13$$

At step 410, a color weighted difference is generated by a color weighted calculation unit according to the first color weighted value and the second color weighted value. The color weighted difference (weight_GbGr_diff) may be expressed as the following equation:

$$\text{weight\_}GbGr\_\text{diff}=(\text{weight\_}Gb-\text{weight\_}Gr)$$

At step 412, a luminance corrected value of the predetermined green pixel is generated by a compensation unit according to a first luminance average, a second luminance average, the de-noise value, the color weighted difference and a control parameter. The first luminance average is determined according to the summation of the plurality of green pixels within the first color area and the volume thereof. The first luminance average may be expressed as the following equation:

$$Gb\_avg=(g0+g1+g2+g5+g6+g7+g10+g11+g12)/9$$

The green pixels g0, g1, g2, g5, g6, g7, g10, g11, and g12 are arranged in the rows with the blue pixels. The second luminance average is determined according to the summation of the plurality of green pixels within the second color area and the volume thereof. The second luminance average may be expressed as the following equation:

$$Gr\_avg=(g3+g4+g8+g9)/4$$

The green pixels g3, g4, g8, and g9 are arranged in the rows with the red pixels.

The luminance corrected value (g_out@g6) of the predetermined green pixel is a summation of the de-noise value (g_lpf), the average of the difference between the first luminance average (Gr_avg) and the second luminance average (Gb_avg), and the product of the color weighted difference (weight_GbGr_diff) and the control parameter (str). The luminance corrected value may be expressed as the following equation:

$$g\_out@g6=g\_lpf+(Gr\_avg-Gb\_avg)/2*weight\_GbGr*str$$

Figure 5:
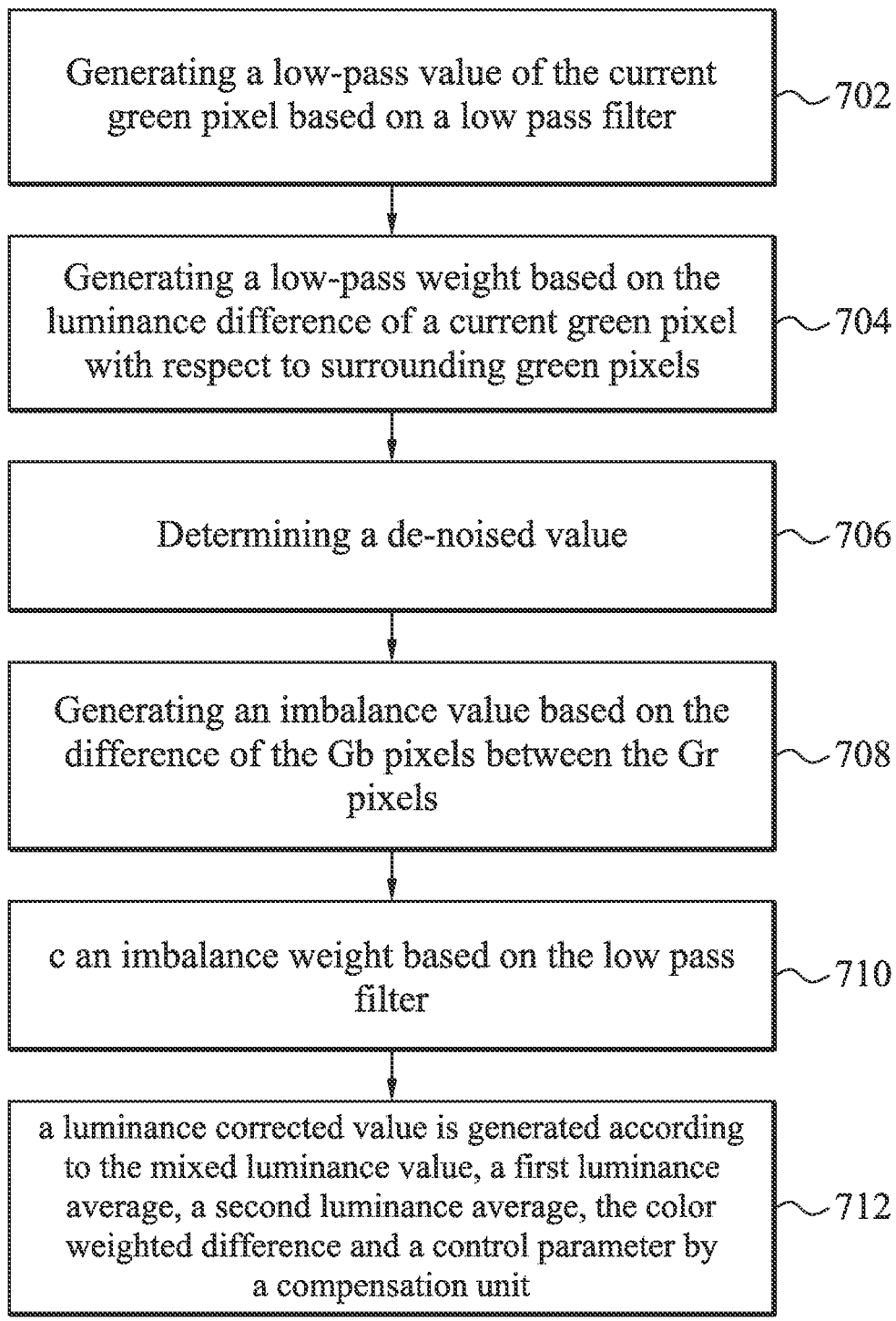
FIG. 5 is a flowchart illustrating the image processing method according to another embodiment of the invention.

FIG. 5 is a flowchart illustrating a de-noise and imbalance correction method according to one embodiment of the invention. The image includes pixels of plural primary colors. In this embodiment, the image is a raw image and includes green pixels, red pixels and blues pixels arranged in Bayer pattern as an example. Referring to FIG. 2, FIG. 2 is a diagram showing an exemplary Bayer pattern in the image. The green pixels include first-green pixels (denoted as Gb) arrange in a row with the blue pixels, and second-green pixels (denoted as Gr) arranged in a row with the red pixels. The method first proceeds to generate a low-pass value of the current green pixel g6 at step 702. The low-pass step 702 may use a low-pass filter shown in FIG. 6 on the current green pixel g6 and the surrounding green pixels. The low-pass value (G_lpf) of the current pixel g6 may be determined according to the following equation as an example:

$$G\_lpf=(G0+G1+G2+G3+G4+G5+4*G6+G7+G8+G9+G10+G11+G12)/16$$

It is noted that alternative low-pass filter, or alternative de-noise process, may also be used in this step.

At step 704, the method generates a low-pass weight W_lpf based on the luminance difference of a current green pixel g6 with respect to surrounding green pixels. The surrounding green pixels of g6 in this embodiment are g0-g12, but the scope of the surrounding green pixels may be alternatively defined depending on different design. If the luminance difference is small, the low-pass weight is designed to be lager in this embodiment. Such that, at step 706, a de-noised value of the current green pixel g6 is generated based on the low-pass value G_lpf and the low-pass weight W_lpf. For example, de-noised value Gd is determined: Gd=G_lpf*W_lpf+G6*(1−W_lpf).

The low-pass weight can be designed in various ways. Here an example is given as a reference. First, the luminance difference of the current pixel g6 with respect to the surrounding green pixels is normalized to determine the low-pass weight for the low-pass value G_lpf. The normalization process first generates a luminance difference average G_diff_abs:

$$G\_diff\_abs=(|G6-G0|+|G6-G1|+|G6-G2|+|G6-G3|+|G6-G4|+|G6-G5|+|G6-G7|+|G6-G8|+|G6-G9|+|G6-G10|+|G6-G11|+|G6-G12|)/12$$

Then the luminance difference average G_diff_abs may be further cropped between a first predetermined threshold (th_h) and a second predetermined threshold (th_l), wherein the first predetermined luminance threshold (th_h) is larger than the second predetermined luminance threshold (th_l). When the luminance difference average G_diff_abs is larger than the first predetermined luminance threshold (th_h), the normalized luminance difference average G_diff_abs is equal to the first predetermined luminance threshold (th_h). When the luminance difference average G_diff_abs is smaller than the second predetermined luminance threshold (th_l), the normalized luminance difference average G_diff_abs is equal to the second predetermined luminance threshold (th_l). Otherwise, the luminance difference average (G_diff_abs) remains unchanged. In other words, the normalized luminance difference average G_diff_abs is limited to be between the first predetermined luminance threshold (th_h) and the second predetermined luminance threshold (th_l). Then, the low-pass weight W_lpf may be determined according to the following equation:

$$W\_lpf=1-(G\_diff\_abs-th\_l)/(th\_h-th\_l)$$

Next at step 708, an imbalance value Gim is generated based on the difference of the Gb pixels (g0, g1, g2, g5, g7, g10, g11, g12) with respect to the Gr pixels (g3, g4, g8, g9) of the surrounding green pixels. First, the Gb pixels are averaged:

$$Gb\_avg=(G0+G1+G2+G5+G6+G7+G10+G11+G12)/9$$

Then, the Gr pixels are averaged:

$$Gr\_avg=(G3+G4+G8+G9)/4$$

Thus, the imbalance value Gim is set:

$$Gim=Gr\_avg-Gb\_avg$$

Next at step 710, the imbalance weight is generated based on the low pass filter such as shown in FIG. 6. First, a first color weighted value (weight_Gb) is generated according to the filter value of the low-pass filter that corresponds to the Gb pixels. The first color weighted value (weight_Gb) may be expressed as the following equation:

$$weight\_Gb=(1/16+1/16+1/16+1/16+4/16+1/16+1/16+1/16+1/16)*weight\_lpf$$

It is noted that the plurality of weighted multipliers 1/16 respectively represent the green pixels g0, g1, g2, g5, g7, g10, g11, and g12 which are arranged in the rows with the blue pixels. The weighted multiplier 4/16 represents the predetermined pixel g6. The second color weighted value is generated based on the filter value of the low-pass filter that corresponds to the Gr pixels, and may be expressed as the following equation:

$$weight\_Gr=(1/16+1/16+1/16+1/16)*weight\_lpf$$

It is noted that the plurality of weighted multipliers 1/16 respectively represent the green pixels g3, g4, g8, and g9 which are arranged in the rows with the red pixels. Then, the imbalance weight may be expressed as the following equation:

$$weight\_GbGr\_diff=weight\_Gb-weight\_Gr$$

Finally at step 712, an output value G_out of the current green pixel g6 is determined based on the de-noised value Gd, the imbalance value Gim and the imbalance weight (weight_GbGr_diff):

$$G\_out=Gd+Gim*weight\_GrGb*str$$

The parameter str can be modified by the user dependent on the application.

Figure 7:
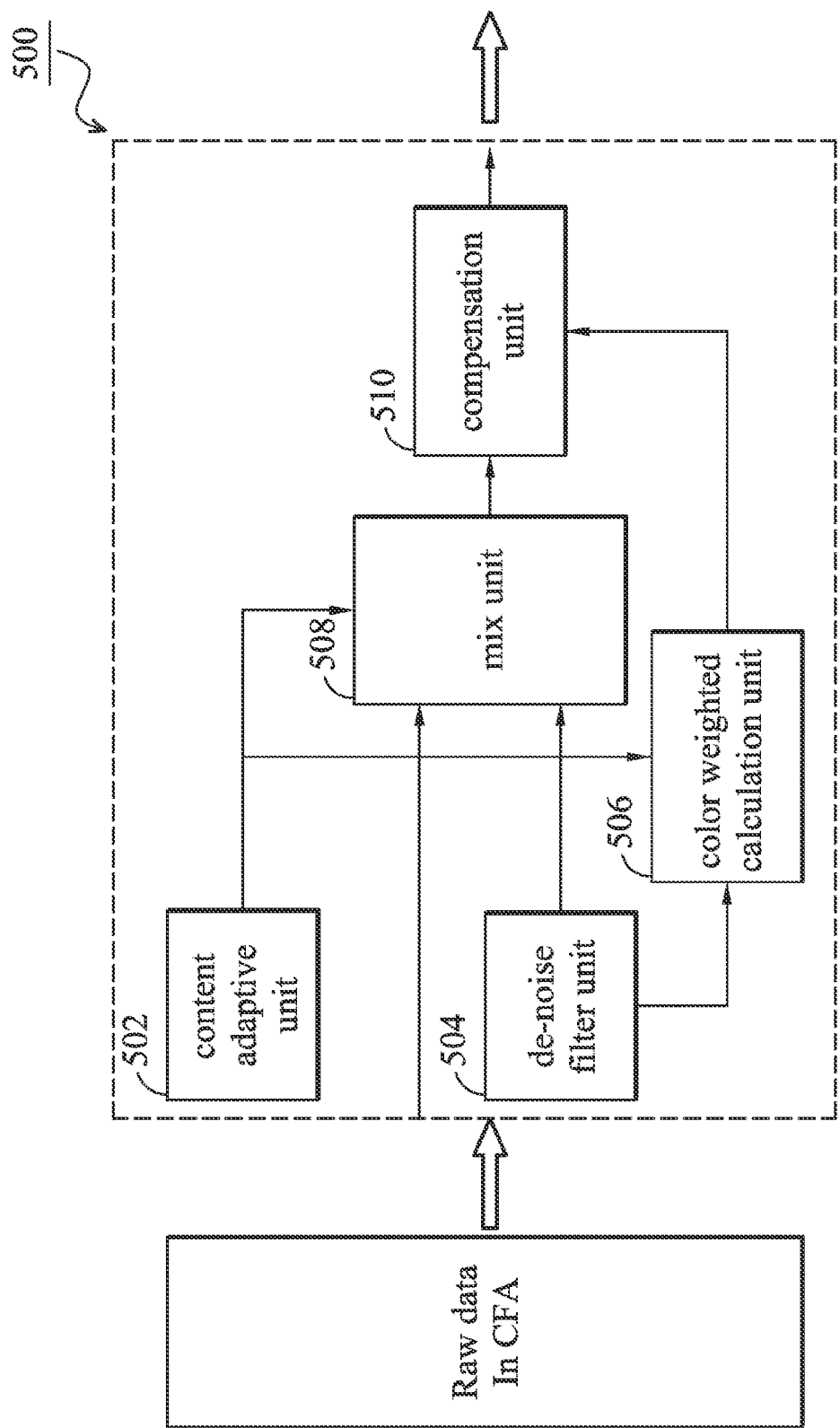
FIG. 7 is a diagram showing an image processing device according to the embodiment of the invention.

FIG. 7 is a diagram showing an image processing device according to the embodiment of the invention. The image processing device 500 includes a content adaptive unit 502, a de-noise filter unit 504, a color weighted calculation unit 506, a mix unit 508 and a compensation unit 510.

The content adaptive unit 502 is used to generate a low-pass weight according to a luminance difference average between a predetermined green pixel and a plurality of green pixels, a first predetermined luminance and a second predetermined luminance. In the embodiment, at first, the luminance difference average is obtained by the content adaptive unit according to a summation of absolute values of the luminance differences between the predetermined green pixel (g6) and a plurality of green pixels, and the volume of the plurality of green pixels. The luminance difference average (G_diff_abs) can be expressed as the following equation:

$$G\_diff\_abs=(|G6-G0|+|G6-G1|+|G6-G2|+|G6-G3|+|G6-G4|+|G6-G5|+|G6-G7|+|G6-G8|+|G6-G9|+|G6-G10|+|G6-G11|+|G6-G12|)/12$$

The values G0-G12 respectively represent the luminance of the green pixels g0-g12.

The first predetermined luminance and the second predetermined luminance and the luminance difference average are used to determine a regulated luminance difference average (G_diff_abs_new). In the embodiment, the first predetermined luminance threshold (th_h) is larger than the second predetermined luminance threshold (th_l). When the luminance difference average (G_diff_abs) is larger than the first predetermined luminance threshold (th_h), the regulated luminance difference average (G_diff_abs_new) is equal to the first predetermined luminance threshold (th_h). When the luminance difference average (G_diff_abs) is smaller than the second predetermined luminance threshold (th_l), the regulated luminance difference average (G_diff_abs_new) is equal to the second predetermined luminance threshold (th_l). Otherwise, the regulated luminance difference average (G_diff_abs_new) is equal to the luminance difference (G_diff_abs). In other words, the regulated luminance difference average (G_diff_abs_new) is limited to be between the first predetermined luminance threshold (th_h) and the second predetermined luminance threshold (th_l).

Finally, the low-pass weight (W_lpf) may be determined according to the following equation:

$$W\_lpf=1-(G\_diff\_abs-th\_l)/(th\_h-th\_l)$$

The de-noise filter unit 504 is used for generating a de-noise value according to a luminance weighted average of a plurality of green pixels. The de-noise value (G_lpf) may be determined according to the following equation:

$$G\_lpf=(G0+G1+G2+G3+G4+G5+4*G6+G7+G8+G9+G10+G11+G12)/16$$

It is noted that the weighted multiplier of the green pixel g6 (i.e. the predetermined green pixel) is 4.

The color weighted calculation unit 506 is used for generating a first color weighted value according to the low-pass weight and a luminance weighted average of the plurality of green pixels within the first color area, generating a second color weighted value according to the low-pass weight and a luminance weighted average of the plurality of green pixels within the second color area, and generating a color weighted difference according to the first color weighted value and the second color weighted value.

The first color weighted value may be expressed as the following equation:

$$weight\_Gb=(1/16+1/16+1/16+1/16+4/16+1/16+1/16+1/16)*weight\_lpf$$

It is noted that the plurality of weighted multipliers 1/16 respectively represent the green pixels g0, g1, g2, g5, g7, g10, g11, and g12 which are arranged in the rows with the blue pixels. The weighted multiplier 4/16 represents the predetermined pixel g6. The second color weighted value may be expressed as the following equation:

$$weight\_Gb=(1/16+1/16+1/16+1/16)*weight\_lpf$$

It is noted that the plurality of weighted multipliers 1/16 respectively represent the green pixels g3, g4, g8, and g9 which are arranged in the rows with the red pixels. The color weighted difference (weight_GbGr_diff) may be expressed as the following equation:

$$weight\_GbGr\_diff=weight\_Gb-weight\_Gr$$

The mix unit 508 is used for generating a mixed luminance value according to the filter weighted value, the de-noise value and the luminance of the predetermined green pixel. The mixed luminance value (g_mix@g6) may be expressed as the following equation:

$$g\_mix@g6=W\_lpf*g\_lpf+(1-W\_lpf)*G6$$

The compensation unit 510 is used for generating a luminance corrected value according to the mixed luminance value, a first luminance average, a second luminance average, the color weighted difference and a control parameter. The first luminance average (Gb_avg) may be expressed as the following equation:

$$Gb\_avg=(G0+G1+G2+G5+G6+G7+G10+G11+G12)/9$$

The green pixels g0, g1, g2, g5, g6, g7, g10, g11, and g12 are arranged in the rows with the blue pixels. The second luminance average (Gr_avg) may be expressed as the following equation:

$$Gr\_avg=(G3+G4+G8+G9)/4$$

The green pixels g3, g4, g8, and g9 are arranged in the rows with the red pixels.

The luminance corrected value is a summation of the mixed luminance value (g_mix@g6), an average of a difference between the first luminance average (Gb_avg) and the second luminance average (Gr_avg), and the product of the color weighted difference (weight_GbGr_diff) and the control parameter (str). The luminance corrected value (g_out@g6) may be expressed as the following equation:

$$g\_out@g6=g\_mix@g6+(Gr\_avg-Gb\_avg)/2*weight\_GbGr\_diff*str$$

Figure 8:
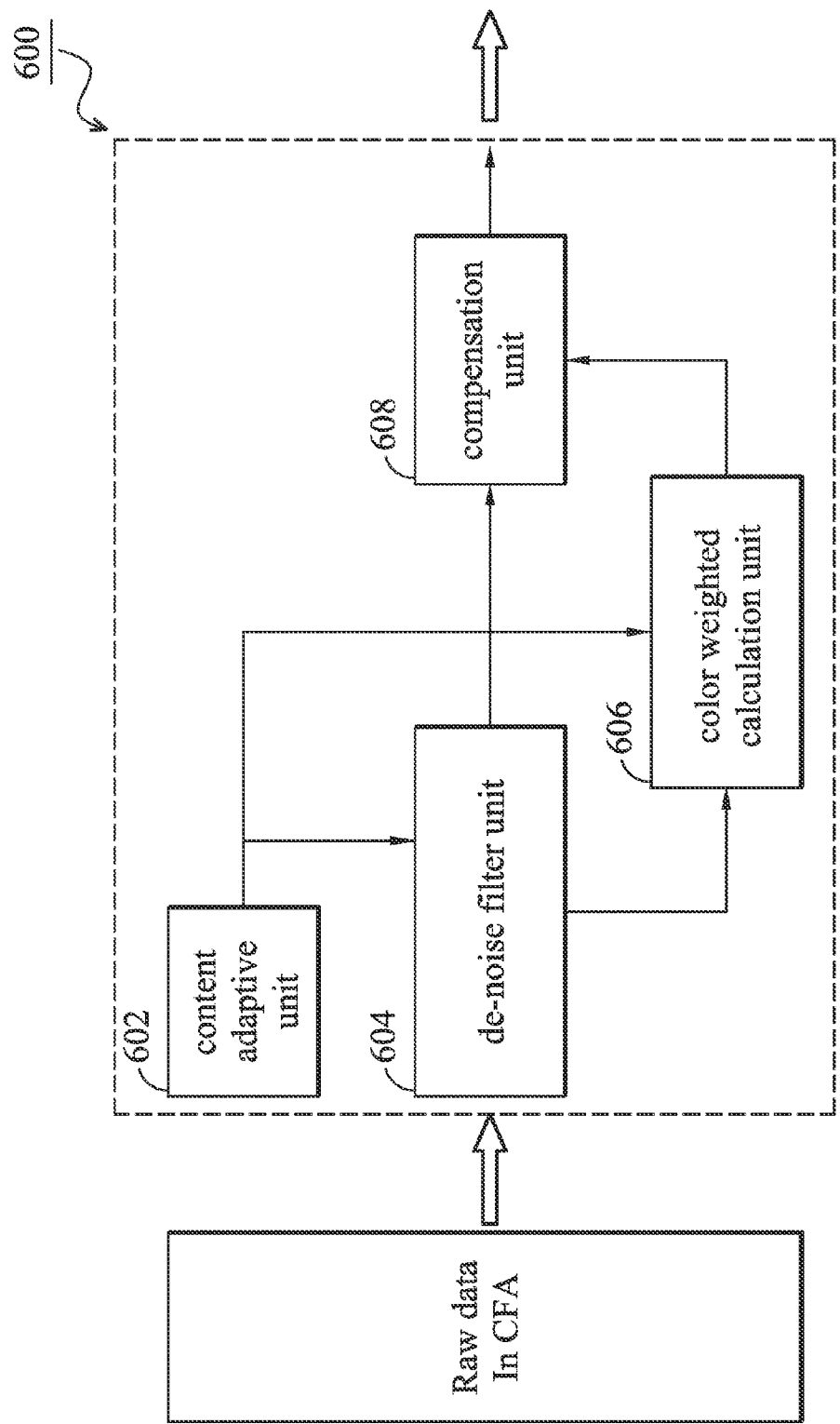
FIG. 8 is a diagram showing an image processing device according to another embodiment of the invention.

FIG. 8 is a diagram showing an image processing device according to another embodiment of the invention. The image processing device includes a content adaptive unit 602, a de-noise filter unit 604, a color weighted calculation unit 606, and a compensation 608.

The content adaptive unit 602 is used for generating a plurality of weighted values according to the luminance difference average between a predetermined green pixel and a plurality of pixels. A single weighted value may be determined according to an absolute value of a difference between the luminance of the predetermined green pixel and the luminance of one of the plurality of the pixels divided by a maximum difference. The weighted values may be expressed as the following equation:

$$Wn=1-|G6-Gn|/diff\_max, clip\ to\ (0,1),$$

wherein n is from 0 to 12. The maximum difference (diff_max) is pre-determined by users such as 255. The range of the weighted value is from zero to one. Wn represents weighted values, and (Gn) represents the luminance values of the green pixels. In the embodiment, the predetermined green pixel is g6. For example, the weighted values W0 and W1 can be expressed as the following equations according to the above equation:

$$W0=1-|G6-G0|/\text{diff\_max},\text{clip to }(0,1)$$

$$W1=1-|G6-G1|/\text{diff\_max},\text{clip to }(0,1)$$

In the embodiment, when the weighted value (Wn) is zero, it means that the luminance between the predetermined green pixel g6 and gn is large, and vise versa.

The de-noise filter unit 604 is used for generating a de-noise value according to the products of each of the weighted values and each of the plurality of green pixels, and a summation of the plurality of weighted values. The summation of the plurality of weighted values may be expressed as the following equation:

$$w\_sum=w0+w1+w2+w3+w4+w5+w6+w7+w8+w9+w10+w11+w12$$

The de-noise value may be expressed as the following equation:

$$g\_lpf=(w0*g0+w1*g1+w2*g2+w3*g3+w4*g4+w5*g5+w6*g6+w7*g7+w8*g8+w9*g9+w10*g10+w11*g11+w12*g12)/w\_sum$$

The color weighted calculation unit 606 is used for generating a first color weighted value according to a summation of the weighted values of the plurality of green values within a first color area and the volume of the plurality of green pixels, and generating a second color weighted value according to a summation of the weighted values of the plurality of green values within a second color area and the volume of the plurality of green pixels, and generating a color weighted difference according to the first color weighted value and the second color weighted value. The first color weighted value (weight_Gb) may be expressed as the following equation:

$$\text{weight}\_Gb=(w0+w1+w2+w5+w6+w7+w10+w11+w12)/13$$

The second color weighted value (weight_Gr) may be expressed as the following equation:

$$\text{weight}\_Gr=(w3+w4+w8+w9)/13$$

The color weighted difference (weight_GbGr_diff) may be expressed as the following equation:

$$\text{weight}\_GbGr\_diff=(\text{weight}\_Gb-\text{weight}\_Gr)$$

The compensation unit 608 is used for generating a luminance corrected value of the predetermined green pixel according to a first luminance average, a second luminance average, the de-noise value, the color weighted difference and a control parameter. The first luminance average is determined according to the summation of the plurality of green pixels within the first color area and the volume thereof. The first luminance average may be expressed as the following equation:

$$Gb\_avg=(g0+g1+g2+g5+g6+g7+g10+g11+g12)/9$$

The green pixels g0, g1, g2, g5, g6, g7, g10, g11, and g12 are arranged in the rows with the blue pixels. The second luminance average is determined according to the summation of the plurality of green pixels within the second color area and the volume thereof. The second luminance average may be expressed as the following equation:

$$Gr\_avg=(g3+g4+g8+g9)/4$$

The green pixels g3, g4, g8, and g9 are arranged in the rows with the red pixels.

The luminance corrected value (g_out@g6) of the predetermined green pixel is a summation of the de-noise value (g_lpf), the average of the difference between the first luminance average (Gb_avg) and the second luminance average (Gr_avg), and the product of the color weighted difference (weight_GbGr_diff) and the control parameter (str). The luminance corrected value may be expressed as the following equation:

$$g\_out@g6=g\_lpf+(Gr\_avg-Gb\_avg)/2*\text{weight}\_GbGr\_diff*str$$

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method adapted to correct the luminance of green pixels in a Bayer pattern, comprising:
   generating a low-pass weight according to a luminance difference average between a predetermined green pixel and a plurality of green pixels, a first predetermined luminance and a second predetermined luminance by a content adaptive unit;
   generating a de-noise value according to a luminance weighted average of a plurality of green pixels by a de-noise filter unit;
   generating a first color weighted value according to the low-pass weight and a luminance weighted average of the plurality of green pixels within the first color area, generating a second color weighted value according to the low-pass weight and a luminance weighted average of the plurality of green pixels within the second color area, and generating a color weighted difference according to the first color weighted value and the second color weighted value by a color weighted calculation unit;
   generating a mixed luminance value according to the low-pass weight, the de-noise value and the luminance of the predetermined green pixel by a mix unit; and
   generating a luminance corrected value according to the mixed luminance value, a first luminance average, a second luminance average, the color weighted difference and a control parameter by a compensation unit.

2. The image processing method as claimed in claim 1, wherein generating a low-pass weight comprises:
   obtaining the luminance difference average according to a summation of absolute values of the luminance differences between the predetermined green pixel and the plurality of green pixels and the volume of the plurality of green pixels.

3. The image processing method as claimed in claim 2, wherein generating a low-pass weight comprises:
   determining the low-pass weight according to a ratio of a difference between a regulated luminance difference average and the second predetermined luminance and a difference between the first predetermined luminance and the second predetermined luminance,
   wherein the regulated luminance average is between the first predetermined luminance and the second predetermined luminance.

4. The image processing method as claimed in claim 3, wherein generating the luminance corrected value of the predetermined green pixel comprises:

determining the luminance corrected value according to a summation of the mixed luminance value, an average of a difference between the first luminance average and the second luminance average, and the product of the color weighted difference and the control parameter.

5. An image processing device adapted to correct the luminance of green pixels in a Bayer pattern, comprising:
 a content adaptive unit, for generating a low-pass weight according to a luminance difference average between a predetermined green pixel and a plurality of green pixels, a first predetermined luminance and a second predetermined luminance;
 a de-noise filter unit for generating a de-noise value according to a luminance weighted average of a plurality of green pixels;
 a color weighted calculation unit for generating a first color weighted value according to the low-pass weight and a luminance weighted average of the plurality of green pixels within the first color area, generating a second color weighted value according to the low-pass weight and a luminance weighted average of the plurality of green pixels within the second color area, and generating a color weighted difference according to the first color weighted value and the second color weighted value;
 a mix unit for generating a mixed luminance value according to the low-pass weight, the de-noise value and the luminance of the predetermined green pixel; and
 a compensation unit for generating a luminance corrected value according to the mixed luminance value, a first luminance average, a second luminance average, the color weighted difference and a control parameter.

6. The image processing device as claimed in claim 5, wherein the content adaptive unit is further used for obtaining the luminance difference average according to a summation of absolute values of the luminance differences between the predetermined green pixel and the plurality of green pixels and the volume of the plurality of green pixels.

7. The image processing device as claimed in claim 6, wherein generating a low-pass weight further comprises:
 determining the low-pass weight according to a ratio of a difference between a regulated luminance average and the second predetermined luminance and a difference between the first predetermined luminance and the second predetermined luminance,
 wherein the regulated luminance average is between the first predetermined luminance and the second predetermined luminance.

8. The image processing device as claimed in claim 7, wherein generating the luminance corrected value of the predetermined green pixel comprises:
 generating an initial green pixel luminance according to the de-noise value, the low-pass weight and the luminance of the predetermined green pixel; and
 determining the luminance corrected value according to a summation of the initial green pixel luminance, an average of a difference between the first luminance average and the second luminance average, and the product of the color weighted difference and the control parameter.

9. A de-noise and imbalance correction method for an image, the image including a plurality of green pixels, red pixels and blue pixels, the green pixels further including a plurality of first-green pixels and second-green pixels, the method comprising:
 generating a low-pass value of a current green pixel based on a low-pass filter;
 determining a low-pass weight based on the luminance difference of the current green pixel from surrounding green pixels;
 determining a de-noised value based on the low-pass value and the low-pass weight;
 generating an imbalance value based on the difference of the first-green pixels of the surrounding green pixels with respect to the second green pixels of the surrounding green pixels;
 determining an imbalance weight based on the low-pass filter; and
 determining an output value of the current green pixel based on the de-noised value, the imbalance value, and the imbalance weight.

10. The de-noise and imbalance correction method as claimed in claim 9, wherein generating the low-pass weight comprises:
 obtaining a luminance difference average according to a summation of absolute values of luminance differences between the current green pixel and surrounding green pixels of the green pixels and a volume of the green pixels.

11. The de-noise and imbalance correction method as claimed in claim 10, wherein generating the low-pass weight further comprises:
 determining the low-pass weight according to a ratio of a difference between the luminance difference average and a second predetermined luminance threshold and a difference between a first predetermined luminance threshold and the second predetermined luminance threshold,
 wherein the luminance average is between the first predetermined luminance threshold and the second predetermined luminance threshold, and the first predetermined luminance threshold is larger than the second predetermined luminance threshold.

12. The de-noise and imbalance correction method as claimed in claim 9, wherein determining the imbalance weight comprises:
 determining a first color weighted value according to the low-pass weight corresponding to the first-green pixels;
 determining a second color weighted value according to the low-pass weight corresponding to the second-green pixels; and
 determining the imbalance weight by subtracting the first color weighted value from the second color weighted value.

13. The de-noise and imbalance correction method as claimed in claim 9, wherein the output value of the current green pixel is determined from an equation of G_outf=Gd+Gim*weight_GrGb_diff*str, Gd is the de-noised value, Gim is the imbalance value, weight_GrGb_diff is the imbalance weight, and str is an user parameter.

* * * * *